Dec. 25, 1962     E. UHER     3,069,856
HYDRAULIC CONTROL SYSTEM
Filed July 26, 1961     3 Sheets-Sheet 1

EDMOND UHER
*INVENTOR.*

BY *Karl F. Ross*

AGENT

EDMOND UHER
*INVENTOR.*

BY Karl F. Ross

AGENT

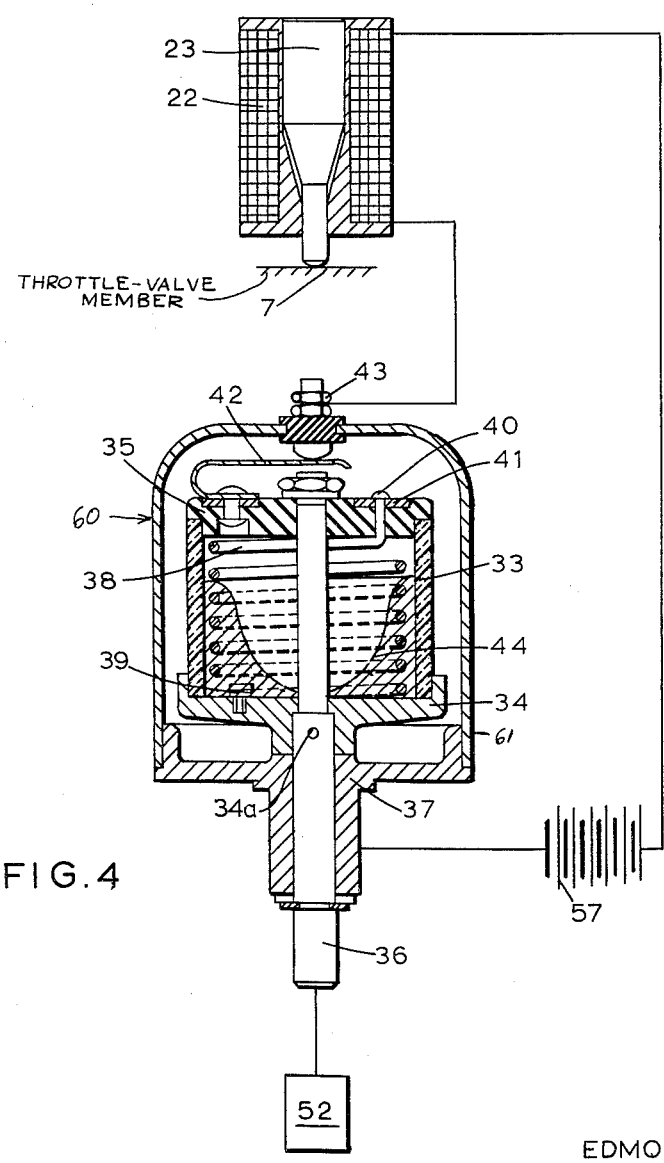

United States Patent Office 3,069,856
Patented Dec. 25, 1962

3,069,856
HYDRAULIC CONTROL SYSTEM
Edmond Uher, Chemin des Mougins,
Cap d'Antibes, France
Filed July 26, 1961, Ser. No. 127,001
Claims priority, application Germany July 28, 1960
12 Claims. (Cl. 60—52)

My present invention relates to a hydraulic control system and, more particularly, to a system for progressively displacing a load in response to changes in the angular velocity of a rotary member.

Hydraulic systems of this type are frequently used to operate a servomotor in response to the operating speed of a driving unit, e.g. the engine or the wheels of an automotive vehicle, as for the purpose of changing the transmission ratio of a torque converter coupled with the engine or operating a clutch interposed between the latter and the wheels. Generally, such systems include a pump entrained by the output shaft of the driving unit to force a hydraulic fluid through a throttling aperture, thereby developing between the pump and the aperture a fluid pressure proportional to the velocity of the driving unit and adapted to operate a pressure-responsive servomotor for controlling the load and performing the desired switching or regulatory functions. While these systems permit ready adjustment of the control action as desired, their many disadvantages have prevented them from gaining universal acceptance. One of their major drawbacks is that their effectiveness is a function not only of the output velocity of the driving unit but also of the viscosity of the fluid traversing the hydraulic circuit system. Since the viscosity of the hydraulic fluid is a function of the temperature thereof, means for maintaining the fluid temperature substantially constant often are required, especially in motor-vehicle applications of the systems. Attempts to render these systems temperature-independent by adjusting the cross-section of the throttling aperture in step with the temperature of the fluid were found to be impractical.

It is, accordingly, an object of my invention to provide a hydraulic control system of the general type referred to which avoids the aforementioned disadvantages of the hitherto existing systems.

A more specific object of the invention is to provide an improved control system of the character described, which is both highly effective and relatively simple, wherein the effects of changes in the viscosity of the hydraulic fluid are minimized.

Yet another object of the instant invention is to provide improved regulating means responsive to the angular velocity of a driving member for operating a control system of the above-described type.

The foregoing objects are realized, in accordance with the invention, by a hydraulic control system comprising a pump operating preferably at a substantially constant rate to force a fluid through a pressure regulating throttle device having a valve member yieldable under the pressure of a fluid against a counteracting force substantially proportional to the angular velocity of a drive shaft or the like, the pump simultaneously acting (generally by way of its high-pressure side) upon a hydraulically or pneumatically operable servomotor coupled with the load. The valve, advantageously, lies in a bypass to the hydraulic supply circuit for the servomotor so that the pressure of the fluid acting upon the servomotor can be maintained substantially proportional, over a wide range, to the counteracting force whereby changes in the viscosity of the fluid due to temperature variations will have little or no effect upon the operating pressure. Whenever the force applied by the fluid to the valve member exceeds the counteracting force determined by the angular velocity of the driving member, the normal dynamic equilibrium existing in the fluid circuit will be disturbed and the valve member displaced to modify (e.g. enlarge) the throttling aperture, thereby restoring the balance of the system. It will be noted that the throttle valve thus functions similarly to a pressure-release safety valve, though with the major difference that in a system according to the invention the holding force to be overcome by the fluid pressure is not constant but variable as a function of the speed of a controlling shaft.

Advantageously, the counteracting force is made to vary not only directly with angular velocity of the driving member but also inversely with the extent of displacement of the valve member from a reference position by the pressure of the fluid so that the valve aperture is stabilized under all operating conditions. The throttling device thus may include adjustable restoring means, such as a spring bearing upon the valve member and biased to an extent dependent upon the angular velocity of the driving member or an electromagnetic coil energized by a current proportional to this velocity, to generate the counteracting force. The driving member is preferably coupled with a tachometer constituting part of a regulating device, which acts mechanically upon the spring or electrically upon the coils to maintain the counteracting force at a value proportional to the angular velocity of the driving member. The regulating means is, according to a more specific feature of the invention, provided with manual adjusting means for altering the counteracting force to suit different condition.

In accordance with still another feature of my invention, I provide means for reducing the effective force of the fluid at the throttling device to a fraction of the delivery pressure of the pump so that the strength of the resilient or electromagnetic restoring means, as well as the dimension of its valve member need not be inordinately great. To this end I provide the valve member with an extension constituting with it a differential piston upon which the pressure of the fluid acts with unequal magnitudes in opposite directions.

The above and other objects, features and advantages of the invention will become more readily apparent from the following description, reference being made to the accompanying drawing in which:

FIG. 4 is a cross-sectional view of a tachometer suitable for use with a control system of the general type shown in FIG. 2.

Figure 1:
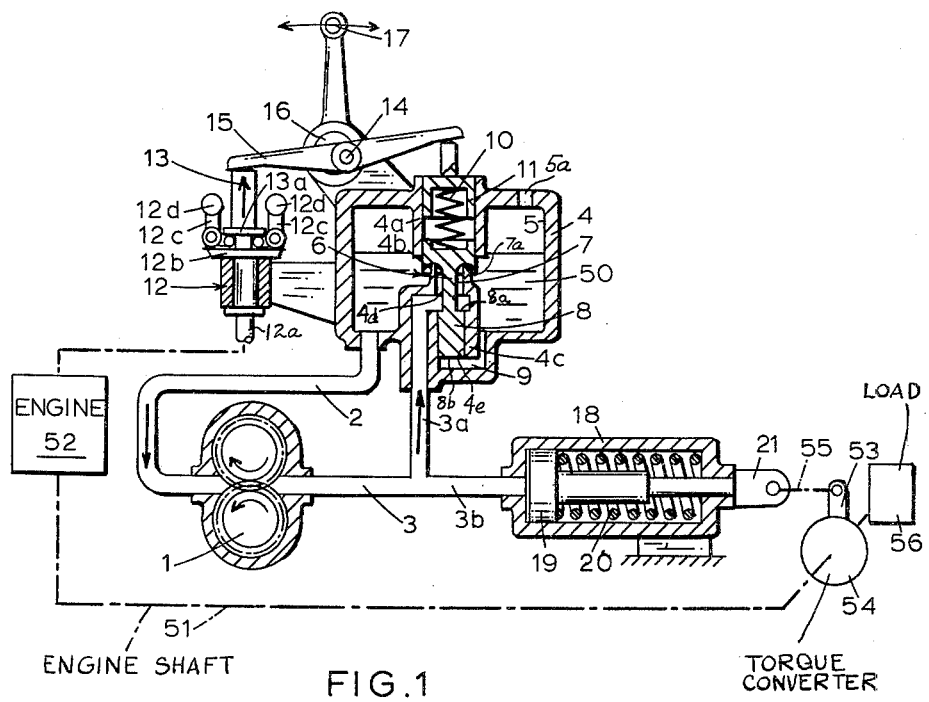
FIG. 1 is a cross-sectional view illustrating, somewhat schematically, a control system according to the invention.

In FIG. 1 I show a control system according to the invention comprising a hydraulic pressure pump 1 of the usual gear type whose suction or intake side is connected via a low-pressure conduit 2 to the inner chamber 5 of a receptacle 4 which constitutes a reservoir for the hydraulic fluid 50. The discharge side of the pump 1 feeds a high-pressure conduit 3, one branch 3a of which is connected to the reservoir 4 via a pressure-regulating throttling device generally designated 6. The throttle 6 comprises a valve member 7, slidably displaceable in a cylindrical sleeve 4a formed in the upper wall of reservoir 4, whose annular face 7a co-operates with a neck 4b forming a bore 4d, coaxial with the sleeve 4a, in a portion 4c of the reservoir supporting the valve member 7. The bypass or bleeder 3a communicates with the bore 4d to apply pressure from the pump 1 to the valve surface 7a and to an opposing surface 8a of a piston 8, formed as an integral extension of the valve member 7, which is shiftable within a bore 4e coaxial with the bore 4d. The end of bore 4e remote from its opening into bypass 3a is connected via a channel 9 with the chamber 5 which is vented to the atmosphere at 5a so that the pressure acting upon the surface 8b of the piston 8 is substantially equal to ambient atmospheric pressure. The valve surface 7a is of slightly larger area than piston surface 8a. A compression coil spring 10 bears upon the valve member 7 and is loaded by an angular-velocity-responsive regulating mechanism which includes a cap 11 bearing upon the spring 10 while being axially displaceable within the sleeve 4a by a double-arm lever 15; the latter has a fulcrum 14 which is carried eccentrically by a pin 16 angularly adjustable by means of an arm 17.

The regulating mechanism further includes a tachometer 12, of the type generally used in centrifugal speed governors, wherein a shaft 12a, rotating synchronously with the output shaft 51 of an engine 52, carries a transverse plate 12b upon which a plurality of angularly spaced levers 12c are pivoted. The latter terminate in the centrifugally displaceable weights 12d and bear upon the shoulder 13a of an axially shiftable stud 13 which engages the double-arm lever 15.

Another branch 3b of the high-pressure line 3 opens into a hydraulic cylinder 18, functioning as a servomotor, whose piston 19 is urged against the force of the pressure fluid by a compression spring 20 and is connected at its lug 21 with the actuating arm 53 of a torque converter 54 via the link 55. Torque converter 54 is coupled with the output shaft 51 of engine 52 and with a load 56 to vary the transmission ratio between the engine 52 and the load 56 in step with the velocity of the output shaft 51.

In operation, the output shaft 51 rotates with an initial angular velocity which is translated via the centrifugal tachometer 12 into an axial displacement of the stud 13 by a proportional amount. Such displacement of stud 13 results in an angular movement of the lever 15 about its fulcrum 14 and a consequent loading of the spring 10 in proportion to the angular velocity of shaft 51. Fluid 50 then flows in a bypass path from the chamber 5 via conduit 2 and pump 1 through the high-pressure conduit 3 and its branch 3a via throttling device 6 back to chamber 5. The valve member 7 is urged by the fluid pressure against the force of the spring 10 until its axial displacement has brought it into a position wherein the countervailing force of spring 10 and the force of the fluid flowing through the bore 4d are substantially in balance. Thus, the pressure of the fluid present in the high-pressure line 3 and transmitted to the servomotor 18 to operate the torque converter 54 is dependent substantially exclusively upon the loading of spring 10 and, consequently, upon the angular velocity of shaft 51. Upon an increase in this velocity, stud 13 is urged further upwardly, as indicated by the arrow, to increase the load upon spring 10 and, therefore, the pressure in line 3, whereas a change in the viscosity of the fluid flowing through the throttling aperture between the valve surface 7a and the neck 4b will merely modify the position of the valve member 7 to compensate for the alteration in viscosity and to maintain the pressure in line 3 at its value proportional to the velocity of shaft 51. The aforementioned increase in the latter velocity and the resulting increase in the pressure of the fluid in line 3 causes the piston 19 to shift axially against its spring 20 and operate the torque converter 54, which is preferably stepless, thereby changing the transmission ratio thereof. An angular adjustment of arm 17 serves to change the loading of spring 10 as desired.

Figure 2:
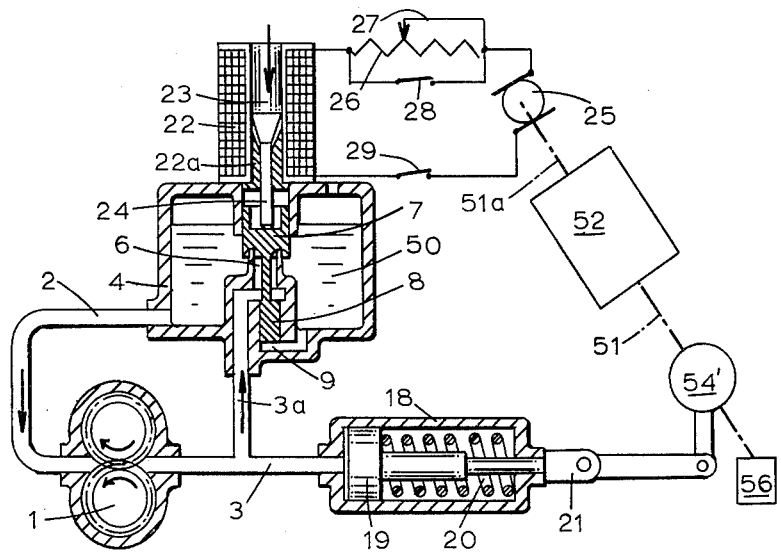
FIG. 2 is a view similar to FIG. 1 of a control system according to another embodiment of the invention.

In FIG. 2 I show another system, according to the invention, which is generally similar to the system of FIG. 1 and wherein identical parts have been given the same reference numerals. The spring 10 and the regulating mechanism 12–17 of FIG. 1 have been replaced in FIG. 2 by another regulating system including a dynamo-tachometer 25 generating electric current at a rate determined by the angular velocity of the shaft 51a, which rotates synchronously with shaft 51 of the engine 52, a potentiometer 26 in series with the dynamo 25 and a solenoid 22 whose armature 23 bears upon the valve member 7 via an extension 24. A cut-out switch 28 is connected in shunt across the potentiometer 26 for selectively short-circuiting it while another switch 29 is connected in series with the dynamo and the solenoid 22. The latter is formed with a magnetically permeable stationary core element 22a, through which the extension 24 of armature 23 freely passes, spaced from the movable armature by a distance of about 2 mm. and adapted to reinforce the magnetic field acting upon the armature. When switch 29 is closed, a current proportional to the angular velocity of shaft 51 flows from the dynamo 25 through the solenoid 22, thereby urging its armature 23 in the direction of the arrow and loading the valve member 7 against the opposing force of the fluid traversing the conduits 2 and 3 as previously described. Thus, the pressure of the fluid operating the servomotor 18 is again proportional to the angular velocity of shaft 51 and any change in the viscosity of the fluid is compensated for by a shift in the position of the valve member 7 against the electromagnetic force of the solenoid as described with reference to FIG. 1.

When it is desired to adjust the counteracting electromagnetic force applied to the valve member 7, switch 28 is opened and the slider 27 of the potentiometer 26 is moved to increase or decrease the resistance of the circuit elements 22 and 26 and, consequently, the current flow through the solenoid 22. Switch 29 may be opened upon occasion when it is desired to relieve spontaneously the pressure in the discharge line 3. This arrangement is particularly suitable for use as a remote-control system wherein the throttle 6 may be disposed at some distance from the tachometer 25; in its application to automotive vehicles the potentiometer 26 may be eliminated to simplify the system and render it less expensive. In the latter case, the output of the dynamo 25 must be unregulated so that the flux through the solenoid 22 varies with the angular velocity of shaft 51a. Clutch 54' becomes effective at a predetermined minimum engine speed.

Most motor-vehicle dynamos or generators are, however, provided with voltage-regulating means for maintaining a substantially constant voltage output, such generators being, therefore, unsuitable for use in the system shown in FIG. 2.

Figure 3:
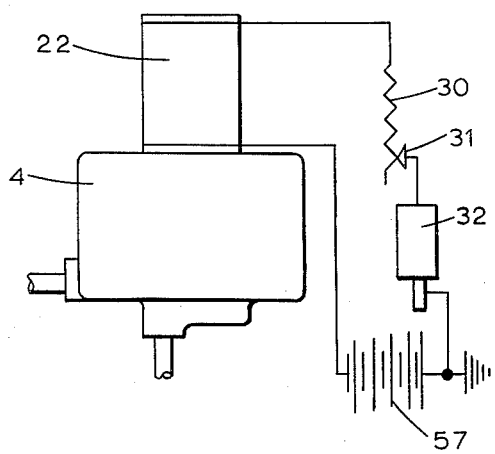
FIG. 3 is a diagram illustrating still another system.

In FIG. 3, I show another system wherein the energization current for the solenoid 22 derives from the usual motor-vehicle storage battery 57 which is connected in series with the solenoid 22 and which includes potentiometer 30 whose slider 31 is displaced by a centrifugal tachometer 32, operated by the engine 52, of the type shown at 12 in FIG. 1. The system of FIG. 3 functions similarly to that of FIG. 2 with the exception that the current determining the solenoid flux loading the valve member 7 is controlled by the potentiometer 30 rather than by the generator 25.

FIG. 4 illustrates a centrifugal tachometer 60 which combines the functions of tachometer 32 and potentiometer 30. The tachometer 60 comprises a bell-like housing 61, carried by a stationary support 37, in which a shaft 36, connected to the output of engine 52, is rotatably journaled. The shaft 36 extends into the bell 61 and is rigidly connected with a horizontal disk 34, rotatable therewith, via a pin 34a. A centrifugal drum 33, preferably a glass cylinder, is mounted on the disk 34 and forms a seal therewith while being closed by a cover 35 of insulating material. The cover 35 is formed along its upper surface with an annular conductive band 41 to which one end of a helical coil 38 of resistance wire (e.g. Nichrome) is connected via a rivet 40. The coil 38 is disposed concentrically within the drum 33 and has its other end conductively connected via a screw 39 to the metallic lower disk 34. A contact spring 42 connects the annular band 41 with a terminal 43, formed in the housing 61, in series with the solenoid 22 and with battery 57 which are returned to the metal support 37 in conductive contact with disk 34. A predetermined quantity of a conductive liquid 44, such as mercury, is contained with the centrifugal drum 33.

When the shaft 36 is rotated by engine 52, the drum 33 and the mercury 44 contained therewithin are rotated simultaneously whereby the mercury 44 is, by centrifugal force, spread along the inner wall of drum 44 and bridges one or more turns of the helical coil 38, thereby short-circuiting these turns to the disk 34. The conductance of the remaining turns is thus proportional to the centrifugal force applied to the mercury by the rotation of shaft 36 and, consequently, proportional to the angular velocity of this shaft. The solenoid 22 is thus energized by a current flowing from the battery 57 through the pool of mercury 44, the unshorted turns of coil 38, contact 42, and the solenoid 22 which is proportional to the angular velocity of shaft 36 to operate the throttle-valve member 7 as previously described. An increase in the angular velocity of the upright shaft 36 will result in a greater centrifugal force and, consequently, in the bridging of a larger number of turns of the coil 38, thereby reducing the resistance of the tachometer 60 and increasing the flux developed by the solenoid 22. Preferably, the quantity of mercury contained in the drum 33 should be such that the pool 44 barely reaches the lowermost turn of the coil 38 so that on standstill the entire resistance of this coil is connected in series with the solenoid 22 when the shaft 36 is not rotating.

The tachometric device is also representative of transistor-type and other conventional tachometers which may be used in connection with the systems described. The invention is also believed to admit of many further variations and modifications readily apparent to persons skilled in the art and intended to be included within the scope of the invention as claimed.

I claim:

1. A system for progressively displacing a load in response to changes in the angular velocity of a rotary member driven at variable speed, comprising tachometric means coupled with said member for entrainment thereby, a hydraulic circuit including a source of fluid under pressure, hydraulically operable control means coupled with said load, said circuit having a duct terminating at said control means for exerting a hydraulic force thereon, pressure-regulating means in said circuit for varying the magnitude of said hydraulic force, said pressure-regulating means including a throttling device forming a restricted passage for said fluid, a valve member in said passage for controlling the effective cross-section thereof, and restoring means tending to maintain said valve member in a predetermined reference position, and mechanism connecting said tachometric means with said restoring means for changing the force thereof resisting displacement of said valve member from said reference position by said fluid, said valve member being shaped as a differential piston having oppositely directed faces of different areas exposed to said fluid, the larger area of said piston being acted upon by said fluid in valve-opening direction.

2. A system for progressively displacing a load in response to changes in the angular velocity of a rotary member driven at variable speed, comprising tachometric means coupled with said member for entrainment thereby, a hydraulic circuit including a pump adapted to deliver a fluid at substantially constant rate, a low pressure duct connected to the suction side of said pump, a high-pressure duct connected to the discharge side of said pump and a bypass interconnecting said ducts, hydraulically operable control means coupled with said load and connected by said high-pressure duct with said pump whereby a hydraulic pressure is exerted on said control means, pressure-regulating means in said bypass for varying the magnitude of said hydraulic pressure, said pressure regulating means include a throttling device forming a restricted passage for said fluid, a valve member in said passage for controlling the effective cross-section thereof, and restoring means tending to maintain said valve member in a position of substantial closure of said bypass, said valve member being shaped as a differential piston having oppositely directed faces of different areas exposed to said fluid in a manner tending to displace said valve member from said position of substantial closure under the pressure of said fluid, and mechanism connecting said tachometric means with said restoring means for changing the force thereof resisting such displacement of said valve member.

3. A system according to claim 2 wherein said restoring means comprises a spring, said mechanism including lever means loaded by said tachometric means for variably biasing said spring.

4. A system according to claim 3 wherein said lever means is provided with an adjustable fulcrum.

5. A system according to claim 2 wherein said restoring means comprises a magnetically displaceable element, said mechanism including electromagnetic means for exerting a displacing force upon said element.

6. A system according to claim 5 wherein said electromagnetic means comprises a coil having an energizing circuit and adjustable impedance means in said energizing circuit for manually controlling the current flow therein.

7. A system according to claim 6, further comprising switch means in said circuit for selectively short-circuiting said impedance means.

8. A system according to claim 6, further comprising circuit-breaker means in said circuit for selectively de-energizing said coil.

9. A system according to claim 5 wherein said tachometric means comprises a variable-voltage generator driven by said member, said electromagnetic means including a coil connected across said generator.

10. A system according to claim 5 wherein said electromagnetic means includes a coil, a source of constant voltage for energizing said coil, and variable-impedance means connected between said voltage source and said coil, said variable-impedance means being connected with said tachometric means for actuation thereby.

11. A system according to claim 5 wherein said electromagnetic means includes a coil and a source of constant voltage for energizing said coil, said tachometric means comprising a velocity-responsive impedance element connected said voltage source and said coil.

12. A system according to claim 11 wherein said velocity-responsive impedance element comprises a rotatable vessel, a resistance in said vessel and a conductive liquid in said vessel, said resistance being positioned for progressive short-circuiting by said liquid upon centrifugal displacement of the latter within said vessel.

References Cited in the file of this patent

UNITED STATES PATENTS

| | | |
|---|---|---|
| 2,657,918 | Parker | Nov. 3, 1953 |
| 2,674,854 | Church | Apr. 13, 1954 |

FOREIGN PATENTS

| | | |
|---|---|---|
| 747,577 | Great Britain | Apr. 11, 1956 |